United States Patent
Cho

(10) Patent No.: US 11,381,522 B2
(45) Date of Patent: Jul. 5, 2022

(54) APPARATUS AND METHOD OF MONITORING ETHERNET COMMUNICATION FOR VEHICLE AND VEHICLE INCLUDING THE SAME

(71) Applicants: HYUNDAI MOTOR COMPANY, Seoul (KR); KIA MOTORS CORPORATION, Seoul (KR)

(72) Inventor: Yong Woon Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 351 days.

(21) Appl. No.: 16/661,399

(22) Filed: Oct. 23, 2019

(65) Prior Publication Data
US 2021/0006510 A1    Jan. 7, 2021

(30) Foreign Application Priority Data
Jul. 1, 2019    (KR) .................. 10-2019-0078756

(51) Int. Cl.
| | |
|---|---|
| *H04L 49/351* | (2022.01) |
| *H04L 43/08* | (2022.01) |
| *H04L 47/41* | (2022.01) |
| *H04L 67/12* | (2022.01) |
| *G07C 5/00* | (2006.01) |
| *B60R 16/023* | (2006.01) |

(52) U.S. Cl.
CPC ............ *H04L 49/351* (2013.01); *H04L 43/08* (2013.01); *H04L 47/41* (2013.01); *H04L 67/12* (2013.01); *B60R 16/023* (2013.01); *G07C 5/008* (2013.01)

(58) Field of Classification Search
CPC ....... H04L 49/351; H04L 43/08; H04L 47/41; H04L 67/12
See application file for complete search history.

(56) References Cited

U.S. PATENT DOCUMENTS

2014/0369177 A1* 12/2014 Keesara .................. H04L 43/10
370/216

FOREIGN PATENT DOCUMENTS

KR    20200073362 A  *  6/2020

* cited by examiner

*Primary Examiner* — Siming Liu
(74) *Attorney, Agent, or Firm* — McDonnell Boehnen Hulbert & Berghoff LLP

(57) ABSTRACT

Disclosed are an apparatus and method of monitoring Ethernet communication for a vehicle and a vehicle including the same. The apparatus includes a traffic statistics data acquisition unit configured to acquire traffic from each of ports of an Ethernet switch, a database (DB) configured to store communication information between controllers connected to the Ethernet switch, a switching path check unit configured to check a switching path of the Ethernet switch, and a monitoring unit configured to calculate a reference value of normal traffic for each port, between ports, and for each traffic flow of the Ethernet switch based on communication information between the controllers and a switching path, to compare the calculated reference value of the normal traffic with traffic acquired from each port of the Ethernet switch, and to monitor whether a communication state of the Ethernet switch is abnormal.

19 Claims, 6 Drawing Sheets

FIG. 3

| Message ID | GENERATION PERIOD | PAYLOAD SIZE | TRANSMISSION ECU | RECEPTION ECU |
|---|---|---|---|---|
| 1 | 10ms | 8 Byte | ECU-1 | ECU-2, ECU-3, ECU-4 |
| 2 | 20ms | 8 Byte | ECU-1 | ECU-2, ECU-5, ECU-6 |
| 3 | 250ms | 800 Byte | ECU-2 | ECU-1, ECU-3, ECU-5 |
| 4 | 250ms | 800 Byte | ECU-2 | ECU-1, ECU-3, ECU-5 |
| ... | ... | ... | ... | ... |
| n | 40ms | 64 Byte | ECU-m | ECU-4, ECU-5, ECU-6 |

FIG. 4

| TRANSMISSION PORT | RECEPTION PORT (unicast) | RECEPTION PORT (multicast) |
|---|---|---|
| 1 | 2,5,6 | {2,3,4} |
| 2 | None | {1,3,5} |
| ... | ... | ... |
| m | 4,5,6 | None |

FIG. 5

| TRANSMISSION \ RECEPTION | Port 1 | Port 2 | Port 3 | Port 4 | Port 5 | Port 6 | ... | Port m |
|---|---|---|---|---|---|---|---|---|
| Port 1 | None | msg01 msg02 | msg01 | msg01 | msg02 | msg02 | ... | ... |
| Port 2 | msg03 msg04 | None | msg03 msg04 | ... | msg03 msg04 | ... | ... | ... |
| ... | ... | ... | ... | ... | ... | ... | ... | ... |
| Port m | ... | ... | ... | msg-n | msg-n | msg-n | ... | — |

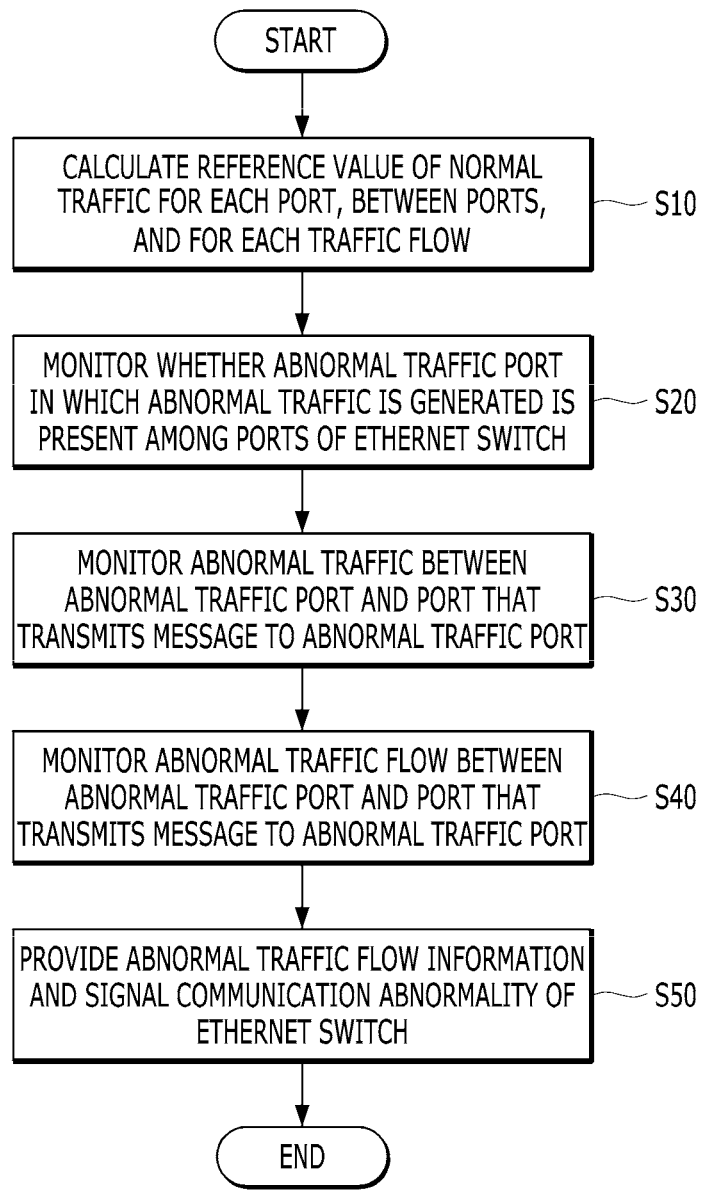

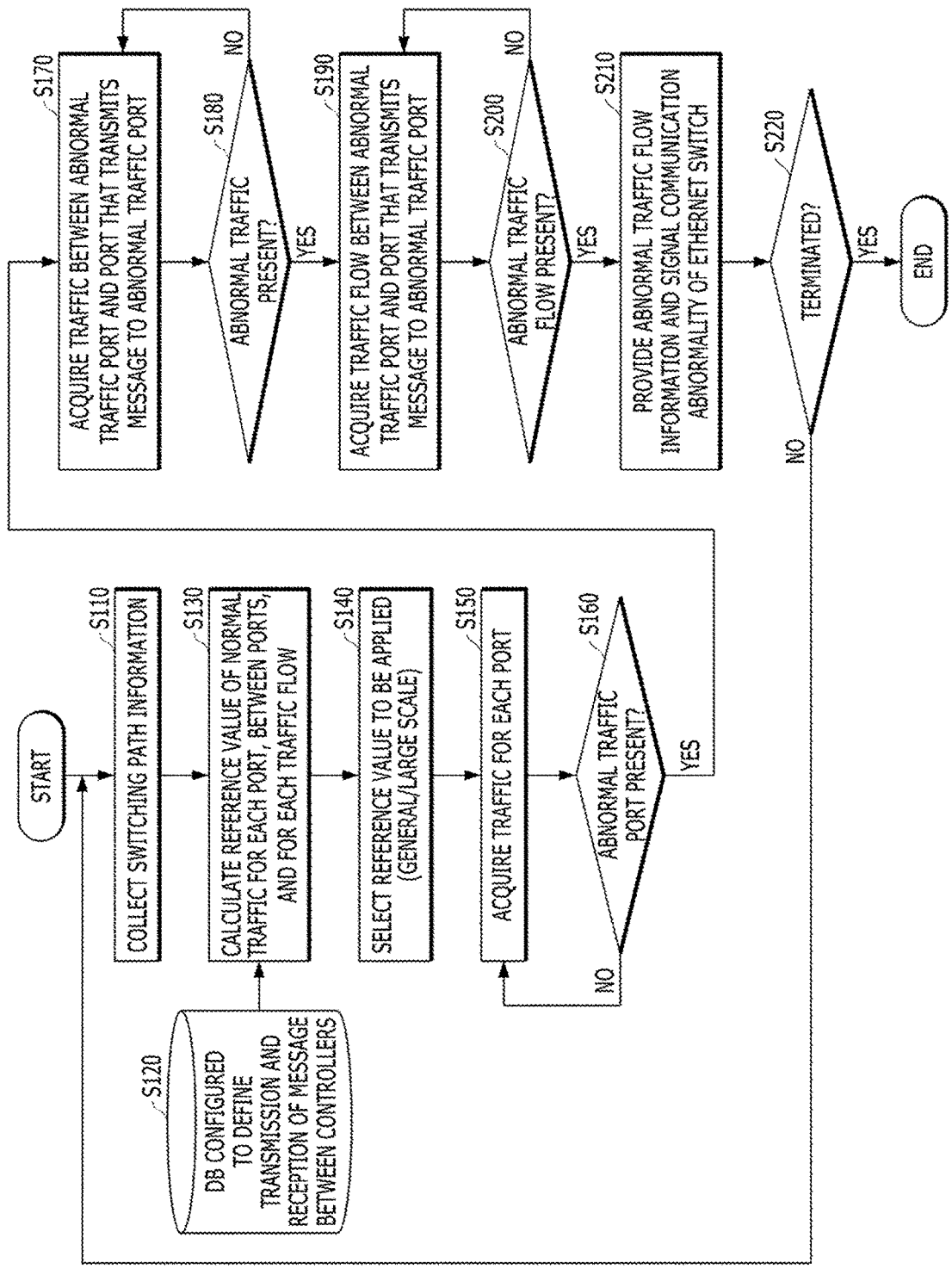

APPARATUS AND METHOD OF MONITORING ETHERNET COMMUNICATION FOR VEHICLE AND VEHICLE INCLUDING THE SAME

CROSS REFERENCE TO RELATED APPLICATIONS

This application claims the benefit of Korean Patent Application No. 10-2019-0078756, filed on Jul. 1, 2019, which is hereby incorporated by reference as if fully set forth herein.

BACKGROUND

Field of the Disclosure

The present disclosure relates to an Ethernet communication monitoring apparatus for a vehicle, and more particularly, to an apparatus and method of monitoring Ethernet communication for a vehicle and a vehicle including the same, for monitoring Ethernet communication of the vehicle using traffic statistics data of an Ethernet switch.

Discussion of the Related Art

According to a recent tendency, a vehicle has applied an electronic control unit (ECU) that uses large-scale data at high speed.

Accordingly, a vehicle has used the Ethernet in an internal communication network of a vehicle that was configured with a controller area network (CAN).

In order to use the Ethernet, an Ethernet switch is required, and in this regard, the Ethernet switch is capable of providing statistics data about traffic for each port.

For example, statistics data about traffic provided for each port may include the number of reception packets, the number of transmission packets, the number of reception missing packets, the number of transmission missing packets, and the like.

A communication monitoring apparatus of a vehicle may monitor a state of a communication network using the statistics data and recognizes the state.

For example, when the number of reception missing packets is present in a specific port, it is determined that an ECU connected to the corresponding port transmits an excessive data or excessive data is injected to a communication line from the outside.

However, a communication monitoring apparatus of a vehicle recognizes an abnormal state of a communication network when statistics data indicating an abnormal state, such as the number of missing packets or the number of error packets among statistics data about traffic is present, but there is a problem in that it is not possible to recognize an abnormal state of a communication network in a normal communication state.

Accordingly, in the future, there is a need to develop an Ethernet communication monitoring apparatus for accurately monitoring an abnormal state of a communication network even in a normal communication state.

SUMMARY

Accordingly, the present disclosure is directed to an apparatus and method of monitoring Ethernet communication in a vehicle and a vehicle including the same that substantially obviates one or more problems due to limitations and disadvantages of the related art.

An object of the present disclosure is to provide an apparatus and method of monitoring Ethernet communication for a vehicle and a vehicle including the same, which calculate a reference value of normal traffic for each port, between ports, and for each traffic flow of an Ethernet switch, and monitor whether a communication state of the Ethernet switch is abnormal based on the calculated reference value of normal traffic, and thus an abnormal state of the communication network may be accurately monitored even in a normal communication state while the vehicle is driven.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an Ethernet communication monitoring apparatus for a vehicle includes a traffic statistics data acquisition unit configured to acquire traffic from each of ports of an Ethernet switch, a database (DB) configured to store communication information between controllers connected to the Ethernet switch, a switching path check unit configured to check a switching path of the Ethernet switch, and a monitoring unit configured to calculate a reference value of normal traffic for each port, between ports, and for each traffic flow of the Ethernet switch based on communication information between the controllers and a switching path, to compare the calculated reference value of the normal traffic with traffic acquired from each of the port of the Ethernet switch, and to monitor whether a communication state of the Ethernet switch is abnormal.

In another aspect of the present disclosure, an Ethernet communication monitoring method of an Ethernet communication monitoring apparatus for a vehicle including a monitoring unit configured to monitor a communication state of an Ethernet switch connected to a plurality of controllers includes calculating a reference value of normal traffic for each port, between ports, and for each traffic flow of the Ethernet switch based on communication information between the controllers and a switching path of the Ethernet switch, by the monitoring unit, monitoring whether an abnormal traffic port in which abnormal traffic is generated is present among ports of the Ethernet switch based on the calculated reference value of the normal traffic for each port, by the monitoring unit, monitoring whether abnormal traffic is present between the abnormal traffic port and a port that transmits a message to the abnormal traffic port based on the calculated reference value of the normal traffic between ports when the abnormal traffic port is present, by the monitoring unit, monitoring whether abnormal traffic flow is present between the abnormal traffic port and the port that transmits the message to the abnormal traffic port based on the calculated reference value of the normal traffic for each traffic flow when the abnormal traffic is present, by the monitoring unit, and providing information on the abnormal traffic flow to signal communication abnormality of the Ethernet switch when the abnormal traffic flow is present, by the monitoring unit.

In another aspect of the present disclosure, an Ethernet communication monitoring method of an Ethernet communication monitoring apparatus for a vehicle including a monitoring unit configured to monitor a communication state of an Ethernet switch connected to a plurality of controllers includes acquiring communication information between controllers and a switching path, by the monitoring unit, calculating a reference value of normal traffic for each port, between ports, and for each traffic flow of the Ethernet switch based on the communication information between the controllers and the switching path of the Ethernet switch, by the monitoring unit, selecting any one of a reference value of normal traffic corresponding to large-scale data and a reference value of normal traffic corresponding to general data among the calculated reference values of the normal traffic, by the monitoring unit, acquiring traffic for each of ports of the Ethernet switch, by the monitoring unit, comparing the acquired traffic for each port with the reference value of normal traffic for each port and monitoring whether an abnormal traffic port in which abnormal traffic is generated is present among the ports of the Ethernet switch, the monitoring unit, acquiring traffic between an abnormal traffic port and a port that transmits a message to the abnormal traffic port when the abnormal traffic port is present, by the monitoring unit, comparing the acquired traffic with the reference value of normal traffic between the ports of the Ethernet switch and whether abnormal traffic is present between the abnormal traffic port and the port that transmits the message to the abnormal traffic port, by the monitoring unit, acquiring traffic flow between the abnormal traffic port and the port that transmits the message to the abnormal traffic port when the abnormal traffic is present, by the monitoring unit, comparing the acquired traffic flow with the reference value of normal traffic for each traffic flow between ports of the Ethernet switch and monitoring whether abnormal traffic flow in which abnormal traffic is generated is present among traffic flows, by the monitoring unit, and providing information on the abnormal traffic flow and signaling communication abnormality of the Ethernet switch, by the monitoring unit.

In another aspect of the present disclosure, a computer readable recording medium having recorded thereon a program for executing an Ethernet communication monitoring method of an Ethernet communication monitoring apparatus for a vehicle may perform procedures provided in the Ethernet communication monitoring method of the Ethernet communication monitoring apparatus.

In another aspect of the present disclosure, a vehicle includes an Ethernet switch communication-connected to a plurality of controllers, and an Ethernet communication monitoring apparatus configured to monitor whether a communication state of the Ethernet switch is abnormal, wherein the Ethernet communication monitoring apparatus calculates a reference value of normal traffic for each port, between ports, and for each traffic flow of the Ethernet switch based on communication information between the controllers and a switching path, compares the calculated reference value of the normal traffic with traffic acquired from each of ports of the Ethernet switch, and monitors whether a communication state of the Ethernet switch is abnormal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a table showing an example of definition of communication between controllers;

FIG. 4 is a table showing an example of setting a path between ports of an Ethernet switch;

FIG. 5 is a table showing an example of a communication table for each port, between ports, and for each traffic flow of an Ethernet switch; and FIGS. 6 and 7 are flowcharts for explanation of an Ethernet communication monitoring method of an Ethernet communication monitoring apparatus for a vehicle according to an embodiment of the present disclosure.

DETAILED DESCRIPTION

Figure 1:
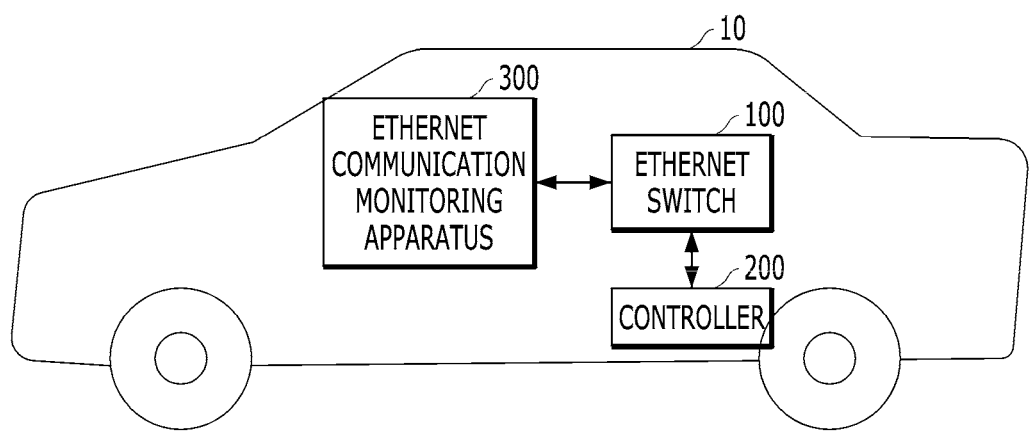
FIG. 1 is a diagram for explanation of a vehicle including an Ethernet communication monitoring apparatus for a vehicle according to an embodiment of the present disclosure.

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification average units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, an apparatus and method of monitoring Ethernet communication for a vehicle and a vehicle including the same applicable to embodiments of the present disclosure will be described in detail with reference to FIGS. 1 to 7.

FIG. 1 is a diagram for explanation of a vehicle including an Ethernet communication monitoring apparatus for a vehicle according to an embodiment of the present disclosure.

As shown in FIG. 1, a vehicle 10 may include an Ethernet switch 100 that is communication-connected to one or more controllers 200, and an Ethernet communication monitoring apparatus 300 configured to monitoring whether a communication state of the Ethernet switch 100 is abnormal.

Here, the Ethernet communication monitoring apparatus 300 may calculate a reference value of normal traffic for each port, between ports, and for each traffic flow of an Ethernet switch based on communication information between controllers and a switching path, may compare the calculated reference value of the normal traffic with traffic acquired from each port of the Ethernet switch, and may monitor whether a communication state of the Ethernet switch is abnormal.

The Ethernet communication monitoring apparatus 300 may be positioned in at least one of a central processing unit (CPU) in the Ethernet switch 100, a control CPU of an electronic control unit (ECU) of the Ethernet switch 100, or an external apparatus connected through an on board diagnosis (OBD) port without being limited thereto.

Then, the Ethernet communication monitoring apparatus 300 may select any one of a first reference value of normal traffic corresponding to large-scale data and a second reference value of normal traffic corresponding to general data among the calculated reference values of normal traffic, and may monitor whether a communication state of the Ethernet switch 100 is abnormal based on the selected first reference value or second reference value.

Here, when selecting the first reference value or the second reference value, the Ethernet communication monitoring apparatus 300 may select the first reference value of the normal traffic corresponding to large-scale data upon receiving data from the controller 200 configured to transmit large-scale data to a port of the Ethernet switch 100 as a monitoring target, or the Ethernet communication monitoring apparatus 300 may select the second reference value of the normal traffic corresponding to general data upon receiving data from the controller 200 configured to transmit general data to the port of the Ethernet switch 100 as a monitoring target.

For example, the controller configured to transmit large-scale data may include at least one of a camera or light detecting and ranging (LIDAR) without being limited thereto.

Then, when monitoring whether a communication state of the Ethernet switch 100 is abnormal, the Ethernet communication monitoring apparatus 300 may monitor whether an abnormal traffic port in which abnormal traffic is generated among ports of the Ethernet switch 100 is present, may monitor whether abnormal traffic is present between an abnormal traffic port and a port that transmits a message to the abnormal traffic port when the abnormal traffic port is present, and may monitor whether abnormal traffic flow is present between an abnormal traffic port and a port that transmits a message to the abnormal traffic port when abnormal traffic is present.

Here, the Ethernet communication monitoring apparatus 300 may provide information on abnormal traffic flow when the abnormal traffic flow is present.

For example, when providing the information on the abnormal traffic flow, the Ethernet communication monitoring apparatus 300 may record the information on the abnormal traffic flow as a fault code in a vehicle, may guide the information to a user, or may transmit the information to a cloud.

When the Ethernet communication monitoring apparatus 300 monitors whether the abnormal traffic port is present, upon acquiring traffic for each port of the Ethernet switch 100, the Ethernet communication monitoring apparatus 300 may compare the acquired traffic for each port with a reference value of normal traffic for each port and may monitor whether an abnormal traffic port in which abnormal traffic is generated is present among ports of the Ethernet switch 100.

When the Ethernet communication monitoring apparatus 300 monitors whether abnormal traffic is present between an abnormal traffic port and a port that transmits a message to the abnormal traffic port, upon acquiring traffic between the abnormal traffic port and the port that transmits a message to the abnormal traffic port, the Ethernet communication monitoring apparatus 300 may compare the acquired traffic with a reference value of normal traffic between ports of the Ethernet switch 100 and may monitor whether the abnormal traffic is present between the abnormal traffic port and the port that transmits a message to the abnormal traffic port.

When the Ethernet communication monitoring apparatus 300 monitors whether abnormal traffic flow is present between the abnormal traffic port and the port that transmits a message to the abnormal traffic port, upon acquiring traffic flow between the abnormal traffic port and the port that transmits a message to the abnormal traffic port, the Ethernet communication monitoring apparatus 300 may compare the acquired traffic flow with a reference value of normal traffic for each traffic flow between ports of the Ethernet switch and may monitor whether abnormal traffic flow in which abnormal traffic is generated is present among traffic flows.

As such, according to the present disclosure, a reference value of normal traffic may be calculated using a communication database (DB) configured to define exchanging of a message between controllers and a communication path between Ethernet controllers, and the calculated reference value may be compared with separated traffic statistics data using the traffic statistics data provided by the Ethernet switch and mirroring to recognize whether Ethernet communication of a vehicle is abnormal.

According to the present disclosure, a first reference value of normal traffic corresponding to the case in which a controller (e.g., a camera and light detecting and ranging (LIDAR)) configured to transmit large-scale data is operated may be calculated, a second reference value of normal traffic corresponding to the case in which the controller configured to transmit large-scale data is not operated may be calculated, and then the second reference value of the normal traffic may be used when the controller configured to transmit large-scale data is not operated, and the first reference value of the normal traffic may be used when the controller configured to transmit large-scale data is operated.

Figure 2:
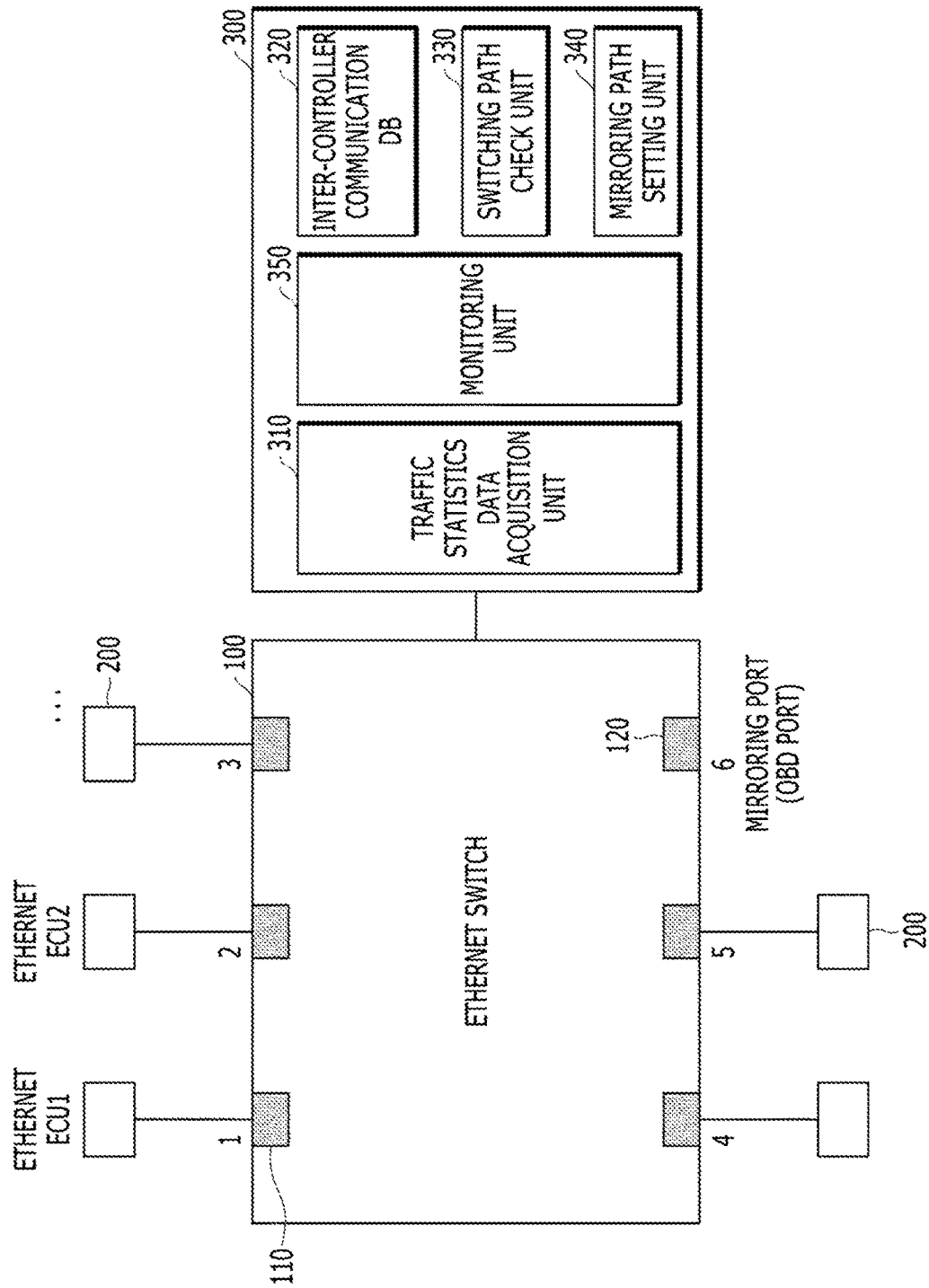
FIG. 2 is a block diagram for explanation of an Ethernet communication monitoring apparatus for a vehicle according to an embodiment of the present disclosure.

FIG. 2 is a block diagram for explanation of an Ethernet communication monitoring apparatus for a vehicle according to an embodiment of the present disclosure.

As shown in FIG. 2, the Ethernet communication monitoring apparatus 300 may include a traffic statistics data acquisition unit 310 configured to acquire traffic from each of ports 110 of the Ethernet switch 100, a database (DB) 320 configured to store communication information between the controllers 200 connected to the Ethernet switch 100, a switching path check unit 330 configured to check a switching path of the Ethernet switch 100, and a monitoring unit 350 configured to control the traffic statistics data acquisition unit 310, the DB 320, and the switching path check unit 330 to monitor whether a communication state of the Ethernet switch is abnormal.

Here, the monitoring unit 350 may calculate a reference value of normal traffic for each port, between ports, and for each traffic flow of an Ethernet switch based on communication information between controllers and a switching path, may compare the calculated reference value of the normal traffic with traffic acquired from each of the ports 110 of the Ethernet switch 100, and may monitor whether a communication state of the Ethernet switch 100 is abnormal.

Depending on the cases, the Ethernet communication monitoring apparatus 300 may further include a mirroring path setting unit 340 configured to set a mirroring path to mirror specific traffic to a mirroring port 120 of the Ethernet switch 100 according to a command of the monitoring unit 350.

Here, the monitoring unit 350 may compare the reference value of normal traffic with traffic acquired from the mirroring port 120 of the Ethernet switch 100 and may monitor whether a communication state of the Ethernet switch 100 is abnormal.

For example, the reference value of the normal traffic may include a reference value of normal traffic between the ports 110 of the Ethernet switch 100 or a reference value of normal traffic for each traffic flow between the ports 110 of the Ethernet switch 100.

For example, traffic acquired from the mirroring port 120 of the Ethernet switch 100 may be traffic between an abnormal traffic port of the Ethernet switch 100 and a port that transmits a message to the abnormal traffic port or traffic for each traffic flow between abnormal traffic ports of the Ethernet switch 100.

The monitoring unit 350 may monitor a reference value of normal traffic between the ports 110 of the Ethernet switch 100 with traffic between an abnormal traffic port of the Ethernet switch 100 and a port that transmits a message to the abnormal traffic port and may monitor the abnormal traffic port in which abnormal traffic is generated among the ports 110 of the Ethernet switch 100.

The monitoring unit 350 may compare a reference value of normal traffic for each traffic flow between the ports 110 of the Ethernet switch 100 with traffic for each traffic flow between abnormal traffic ports of the Ethernet switch 100 and may monitor abnormal traffic flow in which abnormal traffic is generated among traffic flows.

Then, the traffic statistics data acquisition unit 310 may read at least one of a transmission packet counter, a reception packet counter, or an abnormal packet counter from each of the ports 110 of the Ethernet switch 100 and may transmit the same to the monitoring unit 350 according to a request of the monitoring unit 350.

Then, the DB 320 may store communication information including at least one of identification information, a generation period, a payload size, message transmission controller information, or message reception controller information of a communication message between the controllers 200 connected to the Ethernet switch 100.

Here, the DB 320 may receive or store the communication information through a cloud or the mirroring port 120 of the Ethernet switch 100.

When checking the switching path of the Ethernet switch 100, the switching path check unit 330 may check the switching path between the controller 200 and each of the ports 110 of the Ethernet switch 100 based on a preset switching path.

When checking the switching path of the Ethernet switch 100, the switching path check unit 330 may read a packet address input from each of the ports 110 of the Ethernet switch 100 and may set the switching path of the Ethernet switch 100 to a multicast or unicast path based on the packet address.

Here, when setting the multicast or unicast path, the switching path check unit 330 may extract multicast path information from a pre-stored path table, may set the switching path of the Ethernet switch 100 to a multicast path, and may set the remaining switching path other than the set multicast path to the unicast path.

For example, the path table may include reception port information having a unicast switching path corresponding to each transmission port and reception port information having a multicast switching path among ports of the Ethernet switch.

Then, when calculating a reference value of normal traffic, the monitoring unit 350 may calculate a first reference value of normal traffic corresponding to large-scale data and a second reference value of normal traffic corresponding to general data.

When monitoring whether a communication state of the Ethernet switch 100 is abnormal, the monitoring unit 350 may select any one of the first reference value of normal traffic corresponding to large-scale data and the second reference value of normal traffic corresponding to general data among the calculated reference values of normal traffic, and may monitor whether a communication state of the Ethernet switch 100 is abnormal based on the selected first reference value or second reference value.

Here, when selecting the first reference value or the second reference value, the monitoring unit 350 may select the first reference value of the normal traffic corresponding to large-scale data upon receiving data from the controller 200 configured to transmit large-scale data to each of the ports 110 of the Ethernet switch 100 as a monitoring target, or the monitoring unit 350 may select the second reference value of the normal traffic corresponding to general data upon receiving data from the controller 200 configured to transmit general data to each of the ports 110 of the Ethernet switch 100 as a monitoring target.

For example, the controller 200 configured to transmit large-scale data may include at least one of a camera or light detecting and ranging (LIDAR) without being limited thereto.

Then, when monitoring whether a communication state of the Ethernet switch 100 is abnormal, the monitoring unit 350 may monitor whether an abnormal traffic port in which abnormal traffic is generated among the ports 110 of the Ethernet switch 100 is present, may monitor whether abnormal traffic is present between an abnormal traffic port and a port that transmits a message to the abnormal traffic port when the abnormal traffic port is present, and may monitor whether abnormal traffic flow is present between an abnormal traffic port and a port that transmits a message to the abnormal traffic port when abnormal traffic is present.

Here, the monitoring unit 350 may provide information on abnormal traffic flow when the abnormal traffic flow is present.

For example, when providing the information on the abnormal traffic flow, the monitoring unit 350 may record the information on the abnormal traffic flow as a fault code in a vehicle, may guide the information to a user, or may transmit the information to a cloud.

When the monitoring unit 350 monitors whether the abnormal traffic port is present, upon acquiring traffic for each port of the Ethernet switch 100, the monitoring unit 350 may compare the acquired traffic for each port with a reference value of normal traffic for each port and may monitor whether an abnormal traffic port in which abnormal traffic is generated is present among the ports 110 of the Ethernet switch 100.

Here, when acquiring traffic for each port of the Ethernet switch 100, the monitoring unit 350 may control the traffic statistics data acquisition unit 310 to sequentially acquire traffic of the ports 110 of the Ethernet switch 100.

Then, when the monitoring unit 350 monitors whether abnormal traffic is present between an abnormal traffic port and a port that transmits a message to the abnormal traffic port, upon acquiring traffic between the abnormal traffic port and the port that transmits a message to the abnormal traffic port, the monitoring unit 350 may compare the acquired traffic with a reference value of normal traffic between ports 110 of the Ethernet switch 100 and may monitor whether the abnormal traffic is present between the abnormal traffic port and the port that transmits a message to the abnormal traffic port.

When acquiring traffic between the abnormal traffic port and the port that transmits a message to the abnormal traffic port, the monitoring unit 350 may sequentially mirror ports that transmit the message to the abnormal traffic port, and may control the traffic statistics data acquisition unit 310 to sequentially acquire traffic between the abnormal traffic port and the port that transmit a message to the abnormal traffic port, from the mirroring port 120.

Then, when the monitoring unit 350 monitors whether abnormal traffic flow is present between the abnormal traffic port and a port that transmits a message to the abnormal traffic port, upon acquiring traffic flow between the abnormal traffic port and the port that transmits a message to the abnormal traffic port, the monitoring unit 350 may compare the acquired traffic flow with a reference value of normal traffic for each traffic flow between the ports 110 of the Ethernet switch 100 and may monitor whether abnormal traffic flow in which abnormal traffic is generated is present among traffic flows.

Here, when acquiring traffic flow between the abnormal traffic port and the port that transmits a message to the abnormal traffic port, the monitoring unit 350 may sequentially mirror traffic flows and may control the traffic statistics data acquisition unit 310 to sequentially acquire traffic flows from the mirroring port 120.

Ethernet communication in a vehicle may be performed as follows.

First, Ethernet electronic control units (ECUs) may be connected to a preset port of the Ethernet switch 100.

The Ethernet switch 100 may be set to output a packet input from each port through a corresponding path while viewing a destination address of the packet.

Then, upon receiving power, each Ethernet ECU may transmit a packet including an address and a payload to a port connected to the Ethernet ECU.

Then, the Ethernet switch 100 may transmit the packet to the corresponding port according to the destination address and preset path of the packet.

As such, according to the present disclosure, a reference value of normal traffic for each port, between ports, and for each traffic flow of an Ethernet switch may be calculated, whether a communication state of the Ethernet switch is abnormal may be monitored based on the calculated reference value of normal traffic, and thus an abnormal state of the communication network may be accurately monitored even in a normal communication state while a vehicle is driven.

That is, when only traffic statistics data for each of ports provided by the Ethernet switch is used, it is possible to check an abnormal state only in a limiting case such as traffic overflow in an Ethernet network in a vehicle, but according to the present disclosure, whether traffic for each port, between ports, and for each traffic flow is outside a normal reference value may be pre-checked using a communication database (DB) configured to define exchanging of a message between Ethernet controllers included in a Ethernet communication network for a vehicle, path information of an Ethernet switch, and mirroring setting.

Accordingly, according to the present disclosure, whether stable Ethernet communication is performed even while a vehicle is driven may be compared top-down and may be scalably recognized.

FIG. 3 is a table showing an example of definition of communication between controllers. FIG. 4 is a table showing an example of setting a path between ports of an Ethernet switch. FIG. 5 is a table showing an example of a communication table for each port, between ports, and for each traffic flow of an Ethernet switch.

As shown in FIG. 3, according to the present disclosure, a communication information table in which communication between controllers is defined may be stored in a DB.

Here, the communication information table in which communication between controllers is defined may include at least one of identification information, a generation period, a payload size, message transmission controller information, or message reception controller information of a communication message between controllers connected to the Ethernet switch without being limited thereto.

The communication information may be stored in the DB through a mirroring port of the Ethernet switch or a cloud.

According to the present disclosure, a switching path between a controller and each port of an Ethernet switch may be checked based on a preset switching path.

Depending on the cases, according to the present disclosure, a packet address input from each port of the Ethernet switch may be read, and a switching path of the Ethernet switch may be set to a multicast or unicast path based on the packet address.

Here, according to the present disclosure, when the multicast or unicast path is set, multicast path information may be extracted from the pre-stored path table, a switching path of the Ethernet switch may be set to the multicast path, and the remaining switching path other than the set multicast path may be set to the unicast path.

For example, as shown in FIG. 4, the path table may include reception port information having a unicast switching path corresponding to each transmission port and reception port information having a multicast switching path among ports of the Ethernet switch.

In addition, according to the present disclosure, a reference value of normal traffic for each port, between ports, and for each traffic flow of an Ethernet switch may be calculated based on communication information between controllers, and the switching path.

As shown in FIG. 5, according to the present disclosure, a communication table may be generated for each port, between ports, and for each traffic flow using the communication information table of FIG. 3 and the path table of FIG. 4.

That is, according to the present disclosure, a reference value of normal traffic for each port, between ports, and for each traffic flow may be calculated using a payload size of each message.

FIG. 6 is a flowchart for explanation of an Ethernet communication monitoring method of an Ethernet communication monitoring apparatus for a vehicle according to an embodiment of the present disclosure.

As shown in FIG. 6, according to the present disclosure, a reference value of normal traffic for each port, between ports, and for each traffic flow of an Ethernet switch may be calculated based on communication information between controllers and a switching path of the Ethernet switch (S10).

Here, the communication information between controllers may include at least one of identification information, a generation period, a payload size, message transmission controller information, or message reception controller information of a communication message between controllers connected to the Ethernet switch.

The switching path of the Ethernet switch may be a switching path between a controller and each port of the Ethernet switch.

According to the present disclosure, when a reference value of normal traffic is calculated, a first reference value of normal traffic corresponding to large-scale data and a second reference value of normal traffic corresponding to general data may also be calculated.

Depending on the cases, according to the present disclosure, the method may further include, prior to monitoring whether an abnormal traffic port is present, selecting any one of the first reference value of normal traffic corresponding to large-scale data and the second reference value of normal traffic corresponding to general data among the calculated reference value of normal traffic.

Here, according to the present disclosure, when the first reference value or the second reference value is selected, the first reference value of normal traffic corresponding to large-scale data may be selected when data is input from a controller that transmit large-scale data to a port of an Ethernet switch as a monitoring target, or the second reference value of normal traffic corresponding to general data may be selected when data is input from a controller that transmits general data to the port of the Ethernet switch as a monitoring target.

Then, according to the present disclosure, whether an abnormal traffic port in which abnormal traffic is generated is present among ports of the Ethernet switch may be monitored based on the calculated reference value of normal traffic for each port. (S20).

Here, according to the present disclosure, when traffic for each port of the Ethernet switch is acquired, the acquired traffic for each port may be compared with the reference value of normal traffic for each port and whether the abnormal traffic port in which abnormal traffic is generated is present among ports of the Ethernet switch may be monitored.

In this case, according to the present disclosure, traffic may be sequentially acquired for ports of the Ethernet switch, at least one of a transmission packet counter, a reception packet counter, or an abnormal packet counter may be read from each port of the Ethernet switch, and traffic for each port of the Ethernet switch may be acquired.

Then, according to the present disclosure, when the abnormal traffic port is present, whether abnormal traffic is present between an abnormal traffic port and a port that transmits a message to the abnormal traffic port may be monitored based on the calculated reference value of normal traffic between the ports (S30).

Here, according to the present disclosure, when traffic is acquired between the abnormal traffic port and the port that transmits a message to the abnormal traffic port, the acquired traffic may be compared with the reference value of normal traffic between ports of the Ethernet switch, and whether abnormal traffic is present between the abnormal traffic port and a port that transmits a message to the abnormal traffic port may be monitored.

In this case, according to the present disclosure, ports that transmit a message to the abnormal traffic port may be sequentially mirrored, and the mirroring port may sequentially acquire traffic between the abnormal traffic port and a port that transmits a message to the abnormal traffic port.

According to the present disclosure, when abnormal traffic is present, whether abnormal traffic flow is present between an abnormal traffic port and a port that transmits a message to the abnormal traffic port may be monitored based on the calculated reference value of normal traffic for each traffic flow (S40).

Here, according to the present disclosure, when traffic flow between the abnormal traffic port and the port that transmits a message to the abnormal traffic port is acquired, the acquired traffic flow may be compared with a reference value of normal traffic for each traffic flow between ports of an Ethernet switch and whether abnormal traffic flow in which abnormal traffic is generated is present among traffic flows may be monitored In this case, according to the present disclosure, traffic flows may be sequentially mirrored, and a mirroring port may sequentially acquire traffic flows.

Then, according to the present disclosure, when abnormal traffic flow is present, information on the abnormal traffic flow may be provided to signal abnormality of communication of the Ethernet switch (S50).

Here, according to the present disclosure, when the information on the abnormal traffic flow is provided, information on abnormal traffic flow may be recorded as a fault code in a vehicle, may be guided to a user, or may be transmitted to a cloud.

FIG. 7 is a flowchart for explanation of an Ethernet communication monitoring method of an Ethernet communication monitoring apparatus for a vehicle according to another embodiment of the present disclosure.

As shown in FIG. 7, according to the present disclosure, first, communication information between controllers and a switching path may be acquired (S110 and S120).

Then, according to the present disclosure, a reference value of normal traffic for each port, between ports, and for each traffic flow of an Ethernet switch may be calculated based on the acquired communication information between controllers and switching path (S130).

According to the present disclosure, any one of a reference value of normal traffic corresponding to large-scale data and a reference value of normal traffic corresponding to general data may be selected among the calculated reference values of normal traffic (S140).

Then, according to the present disclosure, traffic for each port of the Ethernet switch may be acquired (S150).

Then, according to the present disclosure, the acquired traffic for each port may be compared with the reference value of normal traffic for each port and whether abnormal traffic port in which abnormal traffic is generated is present among ports of the Ethernet switch may be monitored (S160).

According to the present disclosure, when the abnormal traffic port is present, traffic between an abnormal traffic port and a port that transmits a message to the abnormal traffic port may be acquired (S170).

Then, according to the present disclosure, the acquired traffic may be compared with the reference value of normal traffic between ports of the Ethernet switch and whether abnormal traffic is present between the abnormal traffic port and a port that transmits a message to the abnormal traffic port may be monitored (S180).

Then, according to the present disclosure, when the abnormal traffic is present, traffic flow between the abnormal traffic port and a port that transmits a message to the abnormal traffic port may be acquired (S190).

According to the present disclosure, the acquired traffic flow may be compared with a reference value of normal traffic for each traffic flow between ports of the Ethernet switch and whether an abnormal traffic flow in which abnormal traffic is generated is present among traffic flows may be monitored (S200).

Then, according to the present disclosure, when the abnormal traffic flow is present, information on abnormal traffic flow may be provided to signal communication abnormality of the Ethernet switch (S210).

Then, according to the present disclosure, whether an Ethernet communication monitoring end request is present may be checked (S220), and when the Ethernet communication monitoring end request is present, a monitoring procedure may be terminated.

As such, according to the present disclosure, a reference value of normal traffic for each port, between ports, and for each traffic flow of an Ethernet switch may be calculated, whether a communication state of the Ethernet switch is abnormal may be monitored based on the calculated reference value of normal traffic, and thus an abnormal state of the communication network may be accurately monitored even in a normal communication state while a vehicle is driven.

That is, when only traffic statistics data for each port provided by the Ethernet switch is used, it is possible to check an abnormal state only in a limiting case such as traffic overflow in an Ethernet network in a vehicle, but according to the present disclosure, whether traffic for each port, between ports, and for each traffic flow is outside a normal reference value may be pre-checked using a communication database (DB) configured to define exchanging of a message between Ethernet controllers included in a Ethernet communication network for a vehicle, path information of an Ethernet switch, and mirroring setting.

Accordingly, according to the present disclosure, whether stable Ethernet communication is performed even while a vehicle is driven may be compared top-down and may be scalably recognized.

In addition, the Ethernet communication monitoring apparatus according to the present disclosure may be used to remotely diagnose a vehicle when being positioned in a cloud.

For example, when aperiodic traffic is generated in a vehicle (e.g., over the air (OTA) is downloaded in a head unit), an OTA master in the vehicle may temporarily stop vehicle control communication and may make a request for specific controller diagnosis/reprogramming.

When a periodic large-scale signal (e.g., a video signal for surround monitoring during parking) is generated in a vehicle, the signal may be registered in one normal traffic pattern and may be referred to during diagnosis/reprogramming.

In addition, when a periodic large-scale signal (e.g., a video signal for surround monitoring during parking) is generated in a vehicle, a counter about a packet with a packet size equal to or less than a predetermined size may be read and may be compared with a reference value of normal traffic of control data (Non-Audio Video Bridging (AVB)) only.

According to the present disclosure, a computer readable recording medium having recorded thereon a program for executing an Ethernet communication monitoring method of an Ethernet communication monitoring apparatus for a vehicle may perform procedures provided in the Ethernet communication monitoring method of the Ethernet communication monitoring apparatus according to an embodiment of the present disclosure.

A vehicle according to an embodiment of the present disclosure may include an Ethernet switch communication-connected to a plurality of controllers, and an Ethernet communication monitoring apparatus configured to monitor whether a communication state of the Ethernet switch is abnormal, and in this case, the Ethernet communication monitoring apparatus may include a traffic statistics data acquisition unit configured to acquire traffic from each of ports of the Ethernet switch, a database (DB) configured to store communication information between controllers connected to the Ethernet switch, a switching path check unit configured to check a switching path of the Ethernet switch, and a monitoring unit configured to calculate a reference value of normal traffic for each port, between ports, and for each traffic flow of the Ethernet switch based on communication information between controllers and a switching path, to compare the calculated reference value of normal traffic with traffic acquired from each port of the Ethernet switch, and to monitor whether a communication state of the Ethernet switch is abnormal.

An apparatus and method of monitoring Ethernet communication for a vehicle and a vehicle including the same related to at least one embodiment of the present disclosure may calculate a reference value of normal traffic for each port, between ports, and for each traffic flow of the Ethernet switch and may monitor whether a communication state of the Ethernet switch is abnormal based on the calculated reference value of normal traffic, and thus may accurately monitor the abnormal state of a communication network even in a normal communication state when the vehicle is driven.

That is, when only traffic statistics data for each of ports provided by the Ethernet switch is used, it is possible to check an abnormal state only in a limiting case such as traffic overflow in an Ethernet network in a vehicle, but according to the present disclosure, whether traffic for each port, between ports, and for each traffic flow is outside a normal reference value may be pre-checked using a communication database (DB) configured to define exchanging of a message between Ethernet controllers included in a Ethernet communication network for a vehicle, path information of an Ethernet switch, and mirroring setting.

Accordingly, according to the present disclosure, whether stable Ethernet communication is performed even while a vehicle is driven may be compared top-down and may be scalably recognized.

According to the present disclosure, a reference value of normal traffic may be calculated using a communication database (DB) configured to define exchanging of a message between controllers and a communication path between Ethernet controllers, and the calculated reference value may be compared with separated traffic statistics data using the traffic statistics data provided by the Ethernet switch and mirroring to recognize whether Ethernet communication of a vehicle is abnormal.

According to the present disclosure, a first reference value of normal traffic corresponding to the case in which a controller (e.g., a camera and light detecting and ranging (LIDAR)) configured to transmit large-scale data is operated may be calculated, a second reference value of normal traffic corresponding to the case in which the controller configured to transmit large-scale data is not operated may be calculated, and then the second reference value of the normal traffic may be used when the controller configured to transmit large-scale data is not operated, and the first reference value of the normal traffic may be used when the controller configured to transmit large-scale data is operated.

In addition, the Ethernet communication monitoring apparatus according to the present disclosure may be used to remotely diagnose a vehicle when being positioned in a cloud.

For example, when aperiodic traffic is generated in a vehicle (e.g., OTA is downloaded in a head unit), an OTA master in the vehicle may temporarily stop vehicle control communication and may make a request for specific controller diagnosis/reprogramming.

When a periodic large-scale signal (e.g., a video signal for surround monitoring during parking) is generated in a vehicle, the signal may be registered in one normal traffic pattern and may be referred to during diagnosis/reprogramming.

In addition, when a periodic large-scale signal (e.g., a video signal for surround monitoring during parking) is generated in a vehicle, a counter about a packet with a packet size equal to or less than a predetermined size may be read and may be compared with a reference value of normal traffic of control data (Non-AVB) only.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. An Ethernet communication monitoring apparatus for a vehicle, comprising:
   a traffic statistics data acquisition unit configured to acquire traffic statistics data from each of ports of an Ethernet switch;
   a database (DB) configured to store communication information between controllers connected to the Ethernet switch;
   a switching path check unit configured to check a switching path of the Ethernet switch; and
   a monitoring unit configured to calculate a plurality of reference values of normal traffic statistics data for each port, between ports, and for each traffic flow of the Ethernet switch based on the stored communication information between the controllers and each of the switching paths, to compare the calculated reference value of the normal traffic statistics data with traffic statistics data acquired from each of the ports of the Ethernet switch, and to monitor whether a communication state of the Ethernet switch is abnormal.

2. The Ethernet communication monitoring apparatus for a vehicle of claim 1, further comprising a mirroring path setting unit configured to set a mirroring path to mirror specific traffic to a mirroring port of the Ethernet switch according to a command of the monitoring unit.

3. The Ethernet communication monitoring apparatus for a vehicle of claim 1, wherein the traffic statistics data acquisition unit reads at least one of a transmission packet counter, a reception packet counter, or an abnormal packet counter from each of the ports of the Ethernet switch and transmits the read counter to the monitoring unit according to a request of the monitoring unit.

4. The Ethernet communication monitoring apparatus for a vehicle of claim 1, wherein the DB stores communication information including at least one of identification information, a generation period, a payload size, message transmission controller information, or message reception controller information of a communication message between the controllers connected to the Ethernet switch.

5. The Ethernet communication monitoring apparatus for a vehicle of claim 1, wherein, when checking the switching path of the Ethernet switch, the switching path check unit checks each of the ports of the Ethernet switch and the switching path between controllers based on a preset switching path.

6. The Ethernet communication monitoring apparatus for a vehicle of claim 1, wherein, when checking the switching path of the Ethernet switch, the switching path check unit reads a packet address input from each of the ports of the Ethernet switch and sets the switching path of the Ethernet switch to a multicast or unicast path based on the packet address.

7. The Ethernet communication monitoring apparatus for a vehicle of claim 1, wherein, when calculating the reference value of the normal traffic statistics data, the monitoring unit calculates a first reference value of normal traffic corresponding to large-scale data and a second reference value of normal traffic statistics data corresponding to general data.

8. The Ethernet communication monitoring apparatus for a vehicle of claim 1, wherein, when monitoring whether a communication state of the Ethernet switch is abnormal, the monitoring unit selects any one of a first reference value of normal traffic statistics data corresponding to large-scale data and a second reference value of normal traffic statistics data corresponding to general data among the calculated reference value of the normal traffic statistics data, and monitors whether a communication state of the Ethernet switch is abnormal based on the selected first reference value or second reference value.

9. The Ethernet communication monitoring apparatus for a vehicle of claim 1, wherein, when monitoring whether a communication state of the Ethernet switch is abnormal, the monitoring unit monitors whether an abnormal traffic port in which abnormal traffic statistics data generated is present among the ports of the Ethernet switch, monitors whether abnormal traffic statistics data are present between the abnormal traffic port and a port that transmits a message to the abnormal traffic port when the abnormal traffic port is present, and monitors whether abnormal traffic flow is present between the abnormal traffic port and the port that transmits the message to the abnormal traffic port when the abnormal traffic statistics data are present.

10. The Ethernet communication monitoring apparatus for a vehicle of claim 9, wherein the monitoring unit provides information on the abnormal traffic flow when the abnormal traffic flow is present.

11. The Ethernet communication monitoring apparatus for a vehicle of claim 9, wherein, when the monitoring unit monitors whether the abnormal traffic port is present, upon acquiring traffic statistics data for each of the ports of the Ethernet switch, the monitoring unit compares the acquired traffic statistics data for each port with the reference value of the normal traffic statistics data for each port and monitors whether an abnormal traffic port in which abnormal traffic is generated is present among the ports of the Ethernet switch.

12. The Ethernet communication monitoring apparatus for a vehicle of claim 11, wherein, when acquiring the traffic statistics data for each of the ports of the Ethernet switch, the monitoring unit controls the traffic statistics data acquisition unit to sequentially acquire traffic statistics data of the ports of the Ethernet switch.

13. The Ethernet communication monitoring apparatus for a vehicle of claim 9, wherein, when the monitoring unit monitors whether abnormal traffic statistics data are present between the abnormal traffic port and the port that transmits the message to the abnormal traffic port, upon acquiring the traffic statistics data between the abnormal traffic port and the port that transmits the message to the abnormal traffic port, the monitoring unit compares the acquired traffic statistics data with the reference value of the normal traffic statistics data between the ports of the Ethernet switch and monitors whether abnormal traffic statistics data is present between the abnormal traffic port and the port that transmits the message to the abnormal traffic port.

14. The Ethernet communication monitoring apparatus for a vehicle of claim 13, wherein, when acquiring traffic statistics data between the abnormal traffic port of the Ethernet switch and the port that transmits the message to the abnormal traffic port, the monitoring unit sequentially mirrors the port that transmits the message to the abnormal traffic port, and controls the traffic statistics data acquisition unit to sequentially acquire traffic statistics data between the abnormal traffic port and the port that transmits the message to the abnormal traffic port, from a mirroring port.

15. The Ethernet communication monitoring apparatus for a vehicle of claim 9, wherein, when the monitoring unit monitors whether the abnormal traffic flow is present between the abnormal traffic port and the port that transmits the message to the abnormal traffic port, upon acquiring traffic flow between the abnormal traffic port and the port that transmits the message to the abnormal traffic port, the monitoring unit compares the acquired traffic flow with the reference value of the normal traffic statistics data for each traffic flow between the ports of the Ethernet switch, and monitors whether abnormal traffic flow in which abnormal statistics data traffic is generated is present among the traffic flows.

16. The Ethernet communication monitoring apparatus for a vehicle of claim 15, wherein, when acquiring the traffic flow between the abnormal traffic port and the port that transmits the message to the abnormal traffic port, the monitoring unit sequentially mirrors the traffic flows and controls the traffic statistics data acquisition unit to sequentially acquire the traffic flows from a mirroring port.

17. An Ethernet communication monitoring method of an Ethernet communication monitoring apparatus for a vehicle including a monitoring unit configured to monitor a communication state of an Ethernet switch connected to a plurality of controllers, the method comprising:
calculating a reference value of normal traffic statistics data for each port, between ports, and for each traffic flow of the Ethernet switch based on communication information between the controllers and a switching path of the Ethernet switch, by the monitoring unit;
monitoring whether an abnormal traffic port in which abnormal traffic statistics data is generated is present among ports of the Ethernet switch based on the calculated reference value of the normal traffic statistics data for each port, by the monitoring unit;
monitoring whether abnormal traffic statistics data are present between the abnormal traffic port and a port that transmits a message to the abnormal traffic port based on the calculated reference value of the normal traffic statistics data between ports when the abnormal traffic port is present, by the monitoring unit;
monitoring whether abnormal traffic flow is present between the abnormal traffic port and the port that transmits the message to the abnormal traffic port based on the calculated reference value of the normal traffic statistics data for each traffic flow when the abnormal traffic is present, by the monitoring unit; and
providing information on the abnormal traffic flow to signal communication abnormality of the Ethernet switch when the abnormal traffic flow is present, by the monitoring unit.

18. A vehicle comprising:
an Ethernet switch communication-connected to a plurality of controllers; and
an Ethernet communication monitoring apparatus configured to monitor whether a communication state of the Ethernet switch is abnormal,
wherein the Ethernet communication monitoring apparatus calculates a reference value of normal traffic statistics data for each port, between ports, and for each traffic flow of the Ethernet switch based on communication information between the controllers and a switching path, compares the calculated reference value of the normal traffic statistics data with traffic statistics data acquired from each of ports of the Ethernet switch, and monitors whether a communication state of the Ethernet switch is abnormal.

19. The vehicle of claim 18, wherein the Ethernet communication monitoring apparatus is positioned in at least one of a central processing unit (CPU) in the Ethernet switch, a control CPU of an electronic control unit (ECU) of the Ethernet switch, or an external apparatus connected through an on board diagnosis (OBD) port.

* * * * *